(12) United States Patent
Doi et al.

(10) Patent No.: US 10,721,093 B2
(45) Date of Patent: Jul. 21, 2020

(54) ADAPTER APPARATUS, ELECTRONIC APPARATUS AND COMMUNICATION METHOD

(71) Applicant: Kabushiki Kaisha Toshiba, Minato-ku, Tokyo (JP)

(72) Inventors: Takashi Doi, Fuchu Tokyo (JP); Nobuaki Suzuki, Akishima Tokyo (JP); Hideki Miyasato, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 437 days.

(21) Appl. No.: 15/422,279

(22) Filed: Feb. 1, 2017

(65) Prior Publication Data

US 2017/0373882 A1    Dec. 28, 2017

(30) Foreign Application Priority Data

Jun. 24, 2016  (JP) ................................ 2016-125749

(51) Int. Cl.
*H04L 12/40* (2006.01)
*G06F 13/38* (2006.01)

(52) U.S. Cl.
CPC ...... *H04L 12/40169* (2013.01); *G06F 13/385* (2013.01); *H04L 12/40039* (2013.01)

(58) Field of Classification Search
CPC ......... H04L 12/40169; H04L 12/40039; G06F 13/385
See application file for complete search history.

(56) References Cited

U.S. PATENT DOCUMENTS 7,269,673 B2   9/2007   Kim et al.
8,090,030 B2   1/2012   Kim et al.
(Continued)

FOREIGN PATENT DOCUMENTS

JP    2007-535235    11/2007
JP    2010-503134    1/2010
(Continued)

OTHER PUBLICATIONS

VESA DisplayPort Alt Mode on USB Type-C Standard, Version 1.0, Sep. 22, 2014, Video Electronics Standards Association Year: 2014).*
(Continued)

*Primary Examiner* — Nimesh G Patel
(74) *Attorney, Agent, or Firm* — Knobbe, Martens, Olson & Bear, LLP

(57) ABSTRACT

According to one embodiment, an adapter apparatus includes a first connector conforming to the first standard, a second connector conforming to the second standard, a first transmitter and circuitry. The first transmitter transmits a first signal to a first external apparatus connected via the first connector. The first signal associates with a request to determine whether a first mode is supported by the first external apparatus. The first mode corresponds to a communication mode that conforms to a second standard via the first connector. The circuitry generates a second signal when the first external apparatus does not support the first mode. The second signal is used to make an indication representing that the first external apparatus does not support the first mode.

8 Claims, 13 Drawing Sheets

(56) References Cited

U.S. PATENT DOCUMENTS

| | | | |
|---|---|---|---|
| 8,095,713 | B2 | 1/2012 | Minoo et al. |
| 9,037,771 | B2 | 5/2015 | Ota et al. |
| 10,152,442 | B2* | 12/2018 | Bowers ............... G06F 13/4022 |
| 2012/0166702 | A1 | 6/2012 | Toba et al. |
| 2016/0127671 | A1* | 5/2016 | Hundal ............... G06F 13/4247 |
| | | | 348/723 |
| 2016/0306771 | A1* | 10/2016 | Chen ................... G06F 13/4286 |
| 2016/0378971 | A1* | 12/2016 | Dunstan ................ G06F 21/44 |
| | | | 726/17 |
| 2017/0161227 | A1* | 6/2017 | Lai ..................... G06F 13/4081 |
| 2017/0192924 | A1* | 7/2017 | Chiba ................. G06F 13/4282 |
| 2018/0060270 | A1* | 3/2018 | Schnell ............... G06F 13/4282 |

FOREIGN PATENT DOCUMENTS

| | | |
|---|---|---|
| JP | 2010-278969 | 12/2010 |
| JP | 2011-010293 | 1/2011 |
| JP | 2011-509599 | 3/2011 |
| JP | 2012-142690 | 7/2012 |
| JP | 2014-060778 | 4/2014 |
| JP | 2015-111418 | 6/2015 |
| JP | 2016-012184 | 1/2016 |
| WO | WO 2015/118908 | 8/2015 |

OTHER PUBLICATIONS

USB 3.0 Promoter Group, "Universal Serial Bus Type-C Cable and Connector Specification" Release 1.2, http://www.usb.org/developers/docs., Mar. 25, 2016 in 221 pages.

VESA, "Vesa DisplayPort Alt Mode for USV Type-C Standard Feature Summary," http://www.displayport.org/wp-content/uploads/2014/09/DP-Alt-Mode-Overview-for-VESA-v1.pdf, Sep. 22, 2014 in 17 pages.

* cited by examiner

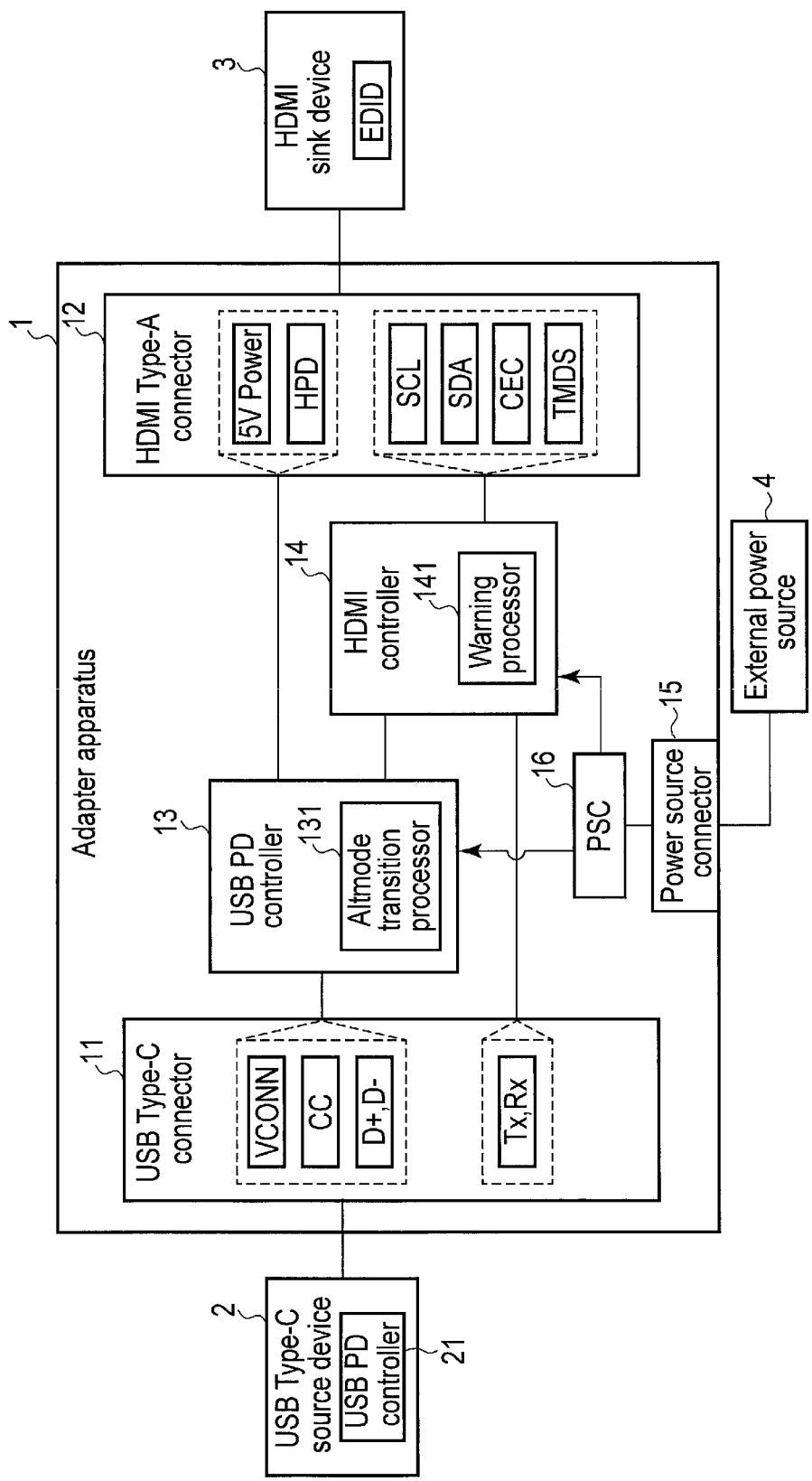
F I G. 1

| Signal assignment | HDMI type A (PIN) | USB type-C | |
|---|---|---|---|
| TMDS data 2+ | 1 | A2 | B2 |
| TMDS data 2 shield | 2 | GND | GND |
| TMDS data 2- | 3 | A3 | B3 |
| TMDS data 1+ | 4 | A11 | B11 |
| TMDS data | 5 | GND | GND |
| TMDS data 1- | 6 | A10 | B10 |
| TMDS data 0+ | 7 | B2 | A2 |
| TMDS data 0 | 8 | GND | GND |
| TMDS data 0- | 9 | B3 | A3 |
| TMDS clock+ | 10 | B11 | A11 |
| TMDS clock shield | 11 | GND | GND |
| TMDS clock- | 12 | B10 | A10 |
| CEC | 13 | Via PD | Via PD |
| Utility | 14 | B6 | A6 |
| SCL | 15 | A8 | B8 |
| SDA | 16 | B8 | A8 |
| DDC/CEC ground | 17 | GND | GND |
| 5V power | 18 | VCONN | VCONN |
| Hot plug detect | 19 | Via PD | Via PD |
| HEAC- | 19 | B7 | A7 |

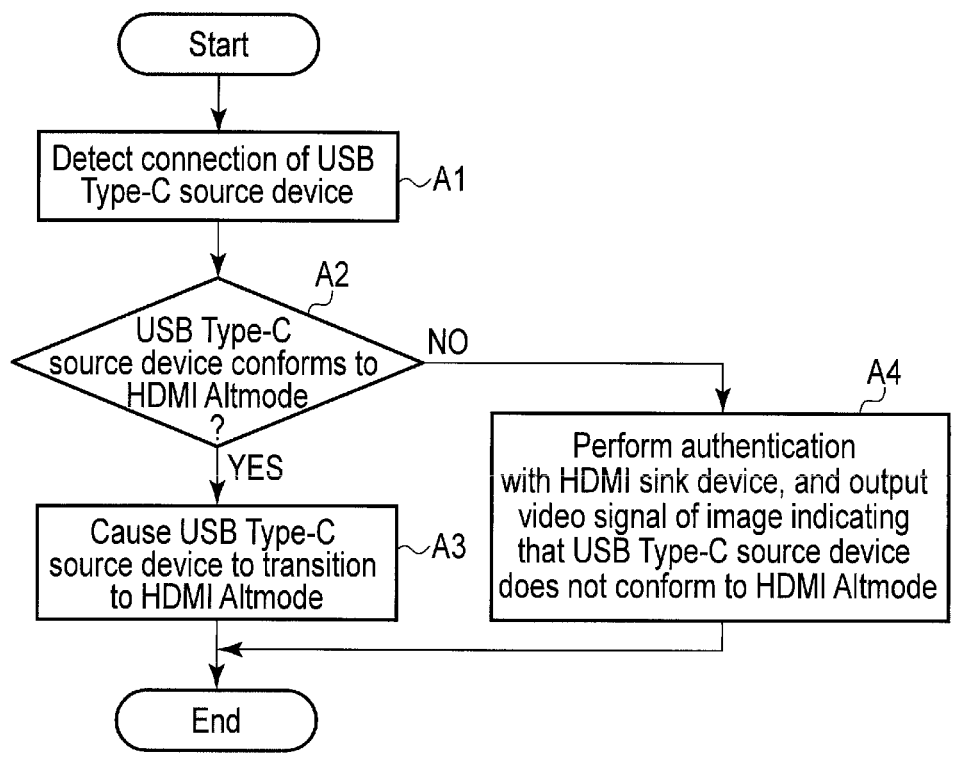
F I G. 4

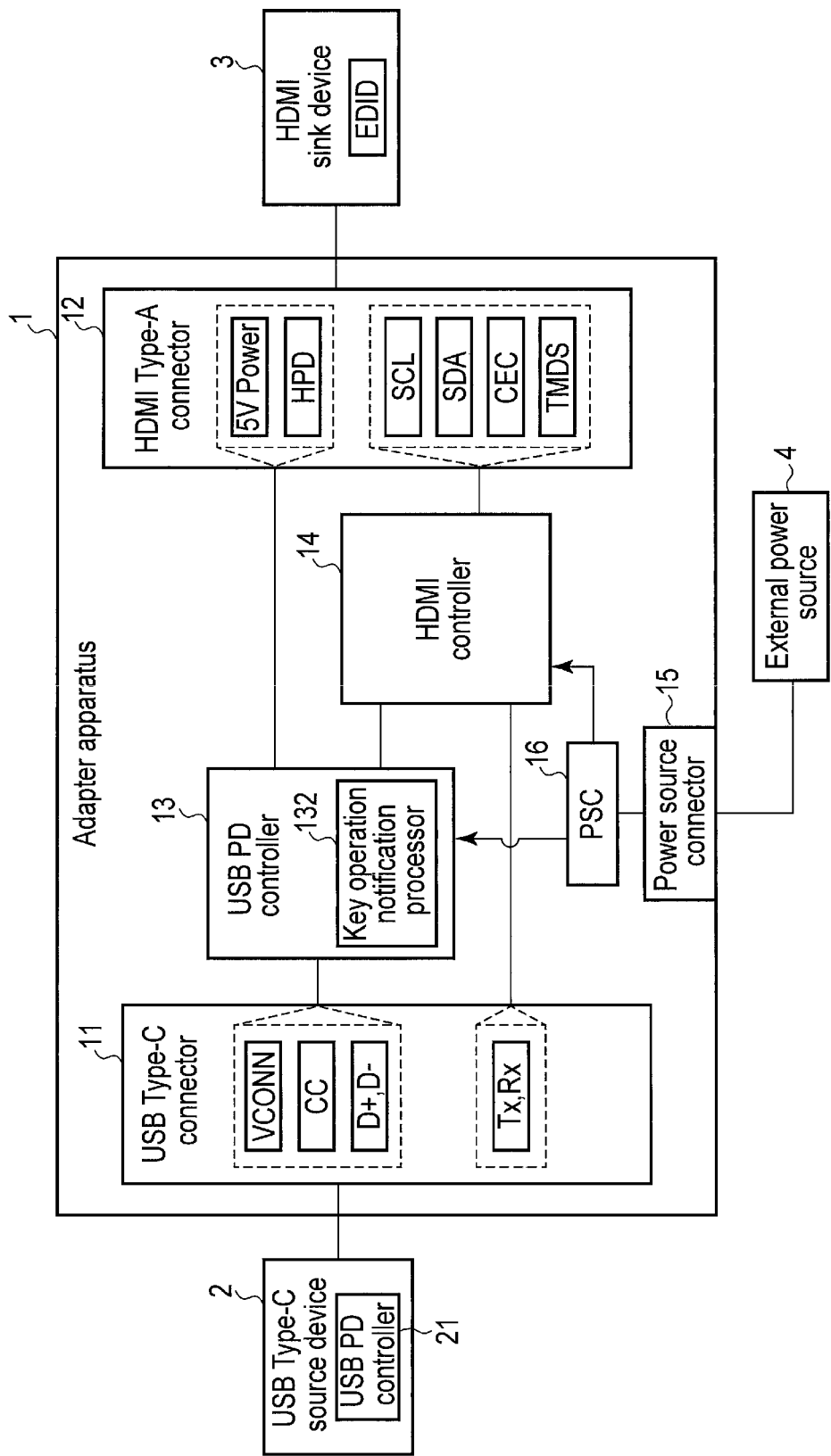
F I G. 5

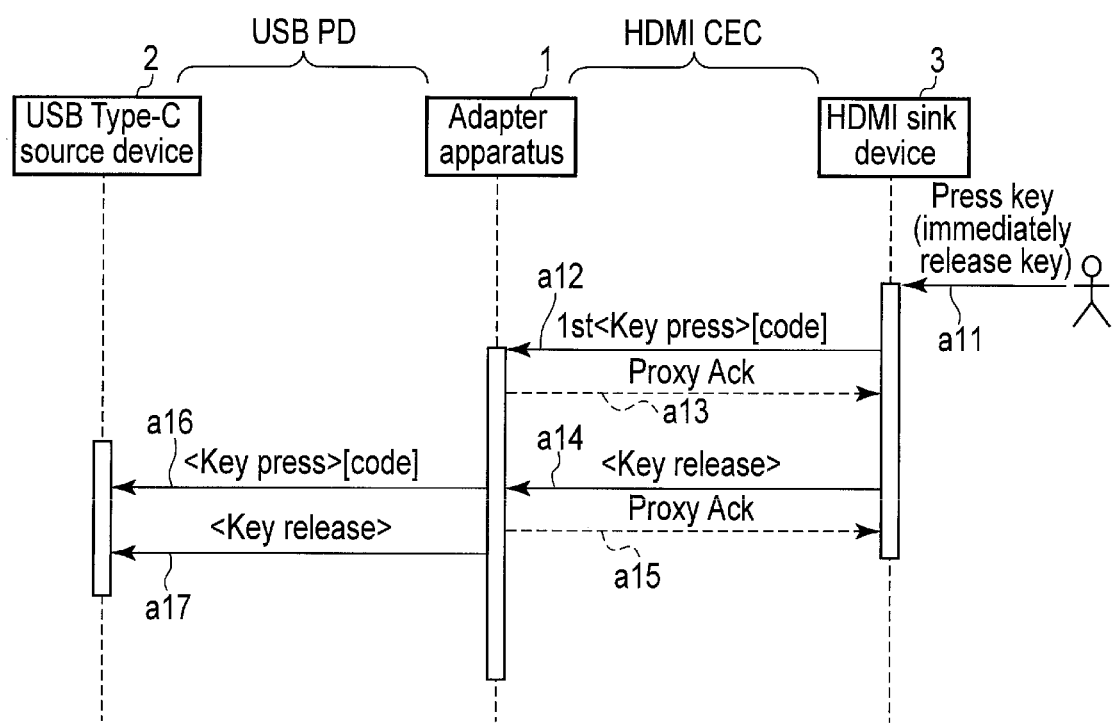
F I G. 7

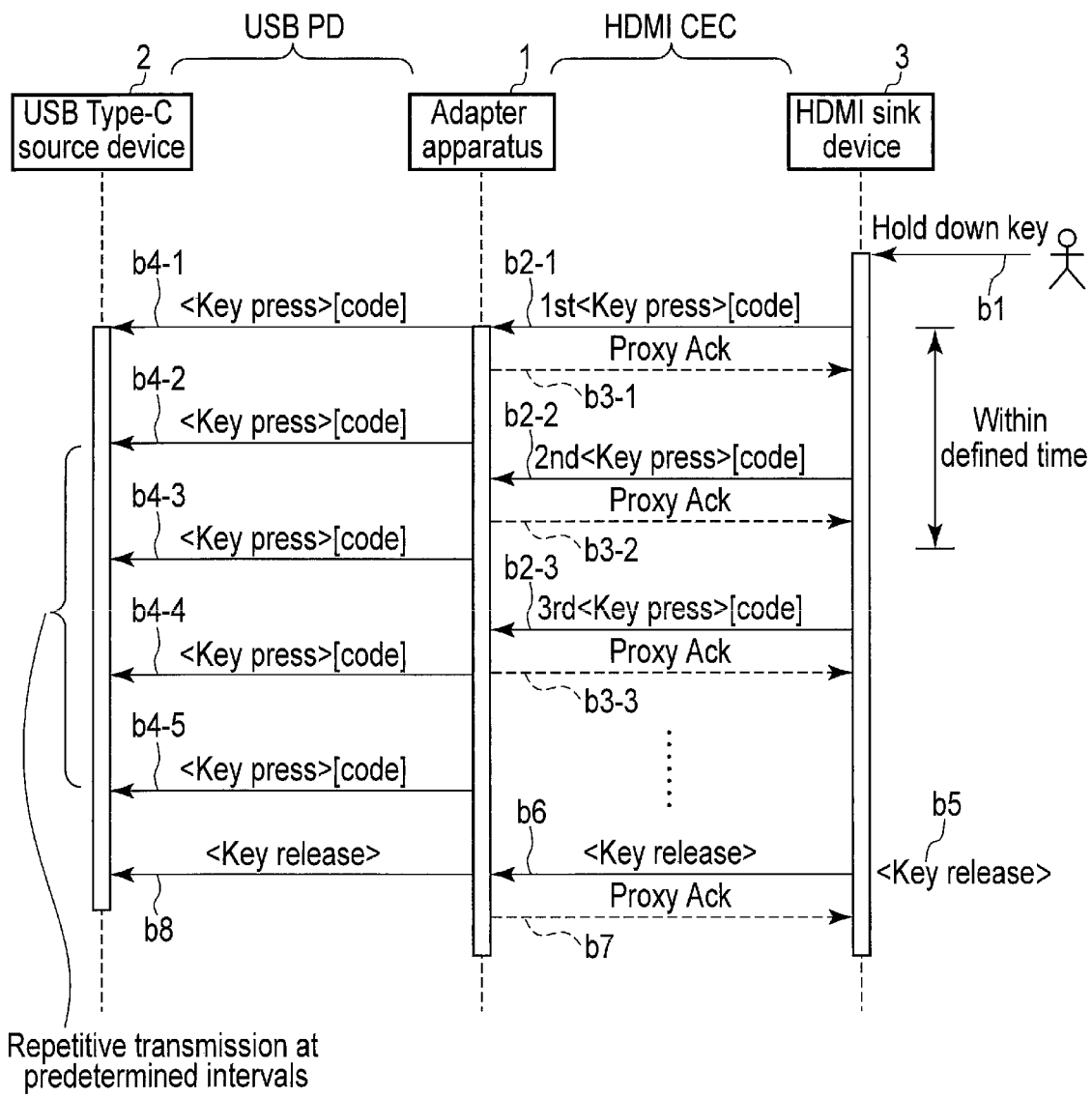
F I G. 8

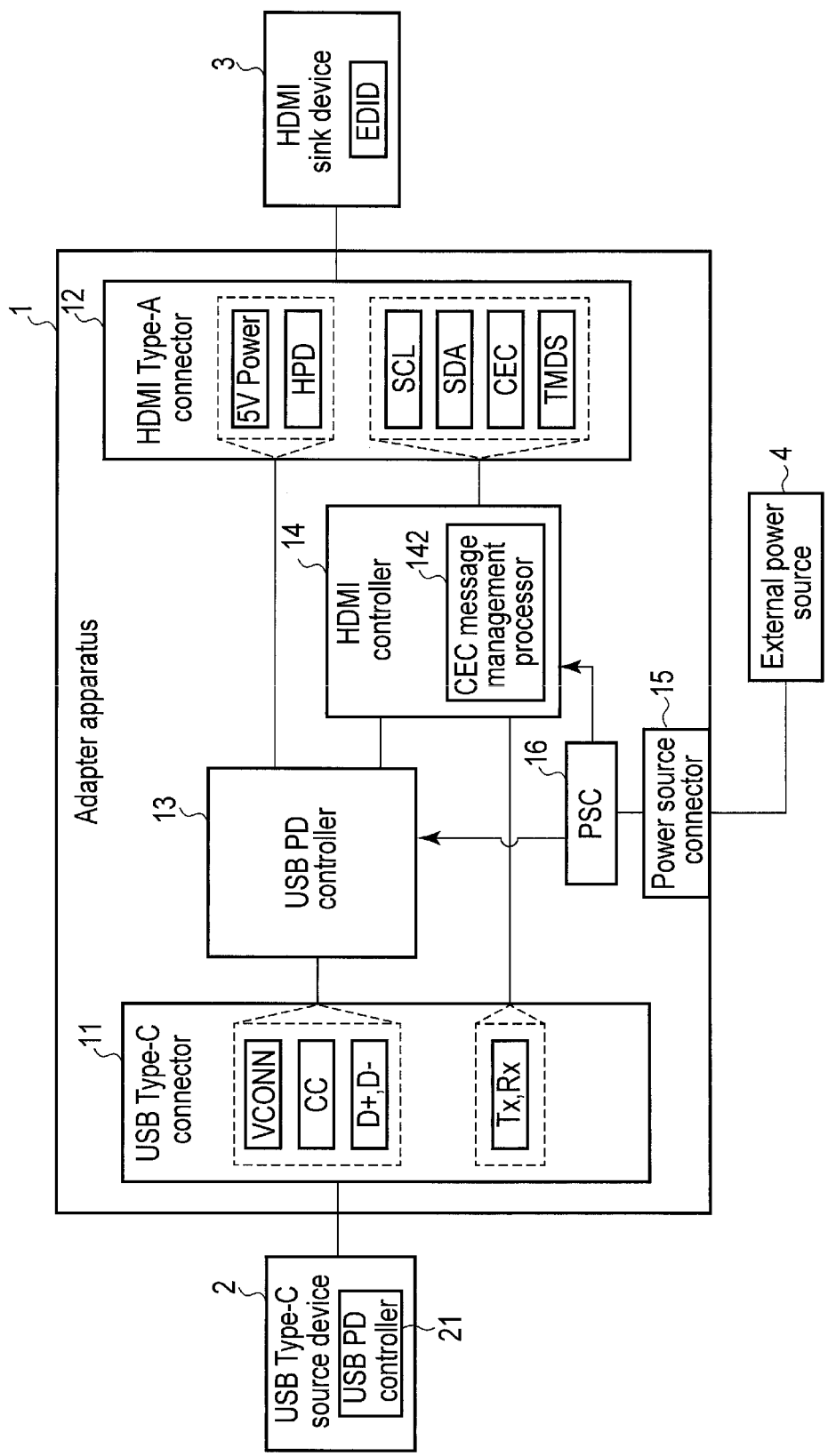
F I G. 10

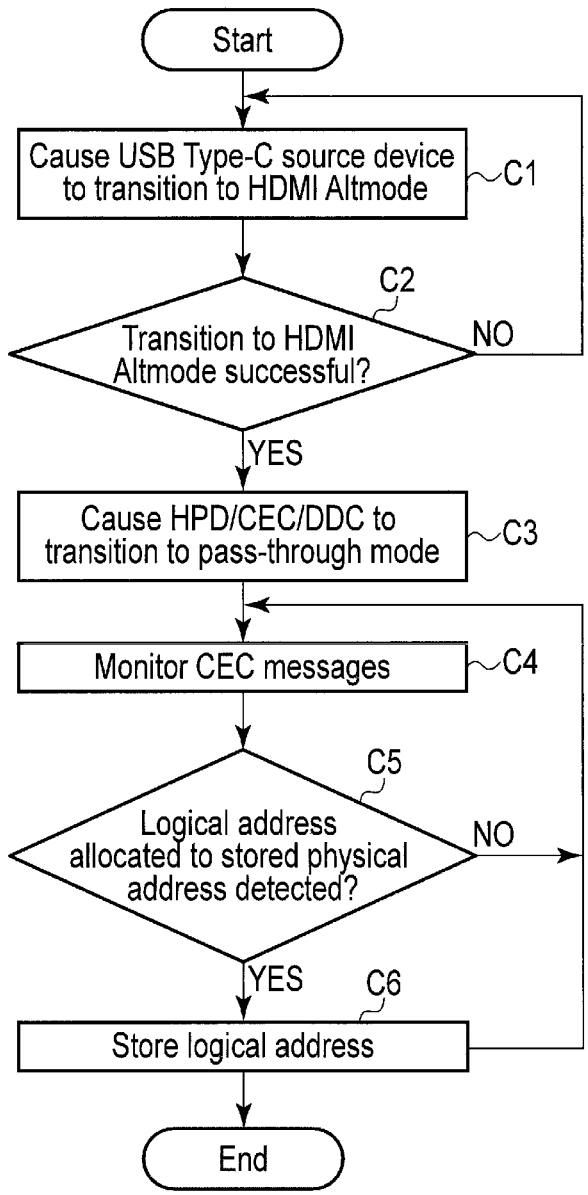
F I G. 12

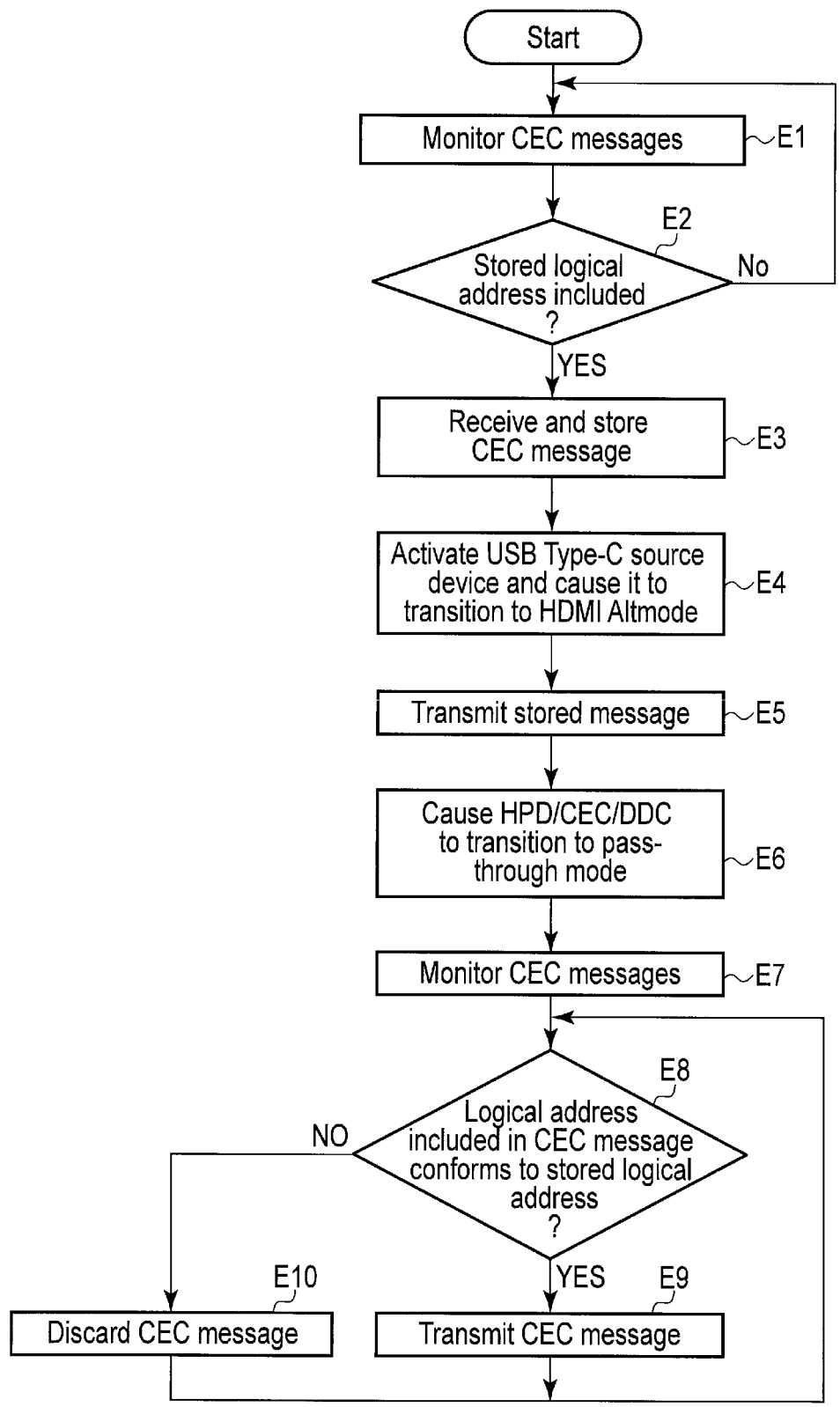
F I G. 14

ADAPTER APPARATUS, ELECTRONIC APPARATUS AND COMMUNICATION METHOD

CROSS-REFERENCE TO RELATED APPLICATIONS

This application is based upon and claims the benefit of priority from Japanese Patent Application No. 2016-125749, filed Jun. 24, 2016, the entire contents of which are incorporated herein by reference.

FIELD

Embodiments described herein relate generally to an adapter apparatus, an electronic apparatus and a communication method.

BACKGROUND

Universal Serial Bus (USB) Type-C connectors, which are expected to be used in mobile computers and smartphones, allow use in conformity with not only USB but also other protocols. Thus, a USB Type-C connector can be shared by a plurality of protocols. Protocols such as Mobile High-definition Link (MHL), DisplayPort and Thunderbolt are already usable in USB TYPE-C connectors as alternative modes (hereinafter "Altmode"). High-Definition Multimedia Interface (HDMI [registered trademark]), which is the de facto video interface standard, will probably also be defined as an Altmode and available in USE TYPE-C connectors.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing the configuration of an adapter apparatus as well as the connection form of the adapter apparatus according to a first embodiment.

FIG. 4 is an exemplary flowchart showing the operation procedure of the adapter apparatus when a USB TYPE-C source device is connected according to the first embodiment.

FIG. 5 is an exemplary view showing the configuration of an adapter apparatus as well as the connection form of the adapter apparatus according to a second embodiment.

FIG. 7 is an exemplary sequence diagram shown for explaining an operation which is performed by the adapter apparatus when a key is pressed as a one-shot operation (on the HDMI sink device side for a USB TYPE-C source device) according to the second embodiment.

FIG. 8 is an exemplary sequence diagram shown for explaining an operation which is performed by an adapter apparatus when a key is held down (on the HDMI sink device side for a USB TYPE-C source device) according to a third embodiment.

FIG. 10 is an exemplary view showing the configuration of an adapter apparatus as well as the connection form of the adapter apparatus according to a fifth embodiment.

FIG. 12 is an exemplary flowchart showing the operation procedure of a process which is performed by the adapter apparatus of the fifth embodiment to store the logical address of a USB TYPE-C source device.

FIG. 14 is an exemplary flowchart showing the operation procedure of a process which is performed by the adapter apparatus of the fifth embodiment to cause the USB TYPE-C source device to retransition to the HDMI Altmode.

DETAILED DESCRIPTION

Figures 2, 3:
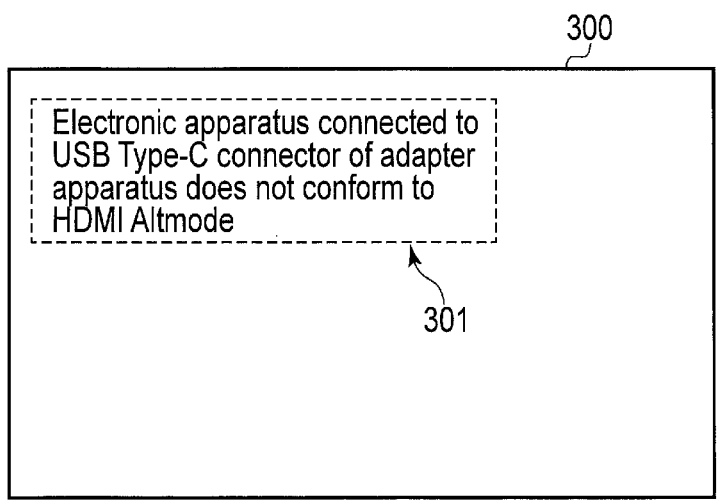
FIG. 2 is an exemplary view showing the details of the correspondence between the signal lines of a USB TYPE-C connector and the signal lines of an HDMI Type-A connector in the adapter apparatus according to the first embodiment.
FIG. 3 is an exemplary view showing the image display of an HDMI sink device by the output of a video signal from the adapter apparatus according to the first embodiment.

Various embodiments will be described hereinafter with reference to the accompanying drawings.

In general, according to one embodiment, an adapter apparatus conforms to a first standard and a second standard. The adapter apparatus comprises a first connector, a second connector, a first transmitter and circuitry. The first connector comprises a first shape conforming to the first standard. A first signal line is to be connected to the first connector. The second connector comprises a second shape conforming to the second standard. A second signal line is to be connected to the second connector. The second shape differs from the first shape. The first transmitter is configured to transmit a first signal to a first external device connected via the first connector. The first signal associates with a request to determine whether a first mode is supported by the first external apparatus. The first mode corresponds to a communication mode that conforms to the second standard via both the first connector and the first signal line. The circuitry is configured to generate a second signal when the first external apparatus does not support the first mode. The second signal is used to make an indication representing that the first external apparatus does not support the first mode.

First Embodiment

A first embodiment is explained below.

FIG. 1 is an exemplary view showing the configuration of an adapter apparatus 1 as well as the connection form of the adapter apparatus 1 according to the present embodiment.

By the adapter apparatus 1, an electronic apparatus which operates as a video output device capable of outputting an image through a USB Type-C connector, such as a Digital Versatile Disc (DVD) player, is connected to an electronic apparatus which operates as a video input device capable of inputting an image through an HDMI Type-A connector, such as a television receiver. To realize this function, the adapter apparatus 1 comprises a USB TYPE-C connector 11 and an HDMI TYPE-A connector 12. The USB TYPE-C connector 11 and the HDMI TYPE-A connector 12 may each be formed as a plug, or may each be formed as a receptacle. Thus, in the adapter apparatus 1, the USB TYPE-C connector 11 and the HDMI TYPE-A connector 12 may be combined in four ways: (1) plug-plug; (2) plug-receptacle; (3) receptacle-plug; and (4) receptacle-receptacle.

The adapter apparatus 1 assumes the following situation. The electronic apparatus which is connected via the USB TYPE-C connector 11 and operates as a video output device supports the HDMI Altmode for performing communication conforming to the HDMI standard via a USB TYPE-C cable, and operates at the HDMI Altmode. In this specification, the electronic apparatus which is connected via the USB TYPE-C connector 11 and operates as a video output device (a source conforming to the HDMI standard) is called a USB TYPE-C source device 2. The electronic apparatus which is connected via the HDMI TYPE-A connector 12 and operates as a video input device (a sink conforming to the HDMI standard) is called an HDMI sink device 3.

FIG. 1 shows only the main signal lines of the USB TYPE-C connector 11 and the HDMI TYPE-A connector 12 regarding the explanation of the adapter apparatus 1. In this regard, FIG. 2 exemplarily shows the details of the correspondence between the signal lines of the USB TYPE-C connector 11 and the signal lines of the HDMI TYPE-A connector 12 in the adapter apparatus 1. In FIG. 2, two columns are shown for the USB TYPE-C connector to correspond to a flip (reverse insertion) of the USB TYPE-C connector. In the columns of the USB TYPE-C connector, "Via PD" indicates that data is converted into a USB Power Delivery (PD) protocol message and transferred.

The adapter apparatus 1 comprises a USB PD controller 13, an HDMI controller 14, a power source connector 15 and a power supply controller (PSC) 16. Here, the adapter apparatus 1 comprises the USB PD controller 13 and the HDMI controller 14. The adapter apparatus 1 may comprise a controller having both the function of the USB PD controller 13 and the function of the HDMI controller 14. The USB PD controller 13 and the HDMI controller 14 realize various functions when, for example, a processor executes the firmware stored in a memory.

In place of the HDMI sink device 3, the USB PD controller 13 performs communication conforming to the USB PD protocol with the USB TYPE-C source device 2 (more specifically, a USB PD controller 21 provided in the USB TYPE-C source device 2). The communication with the USB TYPE-C source device 2 is performed by using, for example, a configuration channel (CC). For example, the operation of the USB PD controller 13 enables the USB TYPE-C source device 2 in a standby state to be activated, or enables the USB TYPE-C source device 2 to transition to the HDMI Altmode. An Altmode transition processor 131 is responsible for the transition process of the USB TYPE-C source device 2 to the HDMI Altmode.

The USB PD controller 13 comprises a function for detecting the connection of the USB TYPE-C source device 2 to the USB TYPE-C connector 11 and a function for detecting the connection of the HDMI sink device 3 to the HDMI TYPE-A connector 12. The detection of the connection of the USB TYPE-C source device 2 is performed by using, for example, a CC. The detection of the connection of the HDMI sink device 3 is performed by using, for example, a hot plug detect (HPD) signal. Moreover, the USB PD controller 13 comprises a function for communicating with the HDMI controller 14. In other words, the HDMI controller 14 comprises a function for communicating with the USB PD controller 13.

The HDMI controller 14 comprises a function for obtaining extended display identification data (EDID) indicating the display capability of the HDMI sink device 3 by communication using a display data channel (DDC [SCL, SDA]) when the detection of the connection of the HDMI sink device 3 is reported from the USB PD controller 13. The EDID obtained by the HDMI controller 14 is transmitted to the USE TYPE-C source device 2 via the USB PD controller 13. Based on the EDID, a video signal suitable for the HDMI sink device 3 is output from the USB TYPE-C source device 2. The HDMI controller 14 relays the video signal to the HDMI sink device 3 ([Tx, Rx]→[TMDS]).

The HDMI controller 14 comprises a function for receiving a consumer electronics control (CEC) signal from the HDMI sink device 3. A CEC signal is defined in the HDMI CEC standard and allows the HDMI sink device 3 to control the USE TYPE-C source device 2. A CEC signal is transmitted from the HDMI sink device 3 when, for example, an operation for the USB TYPE-C source device 2 is performed by the remote controller of the HDMI sink device 3. The CEC signal received by the HDMI controller 14 is transmitted to the USE TYPE-C source device 2 via the USB PD controller 13. The number of pins usable in the USB TYPE-C connector 11 is less than that used in the HDMI standard. Therefore, when the CEC signal received from the HDMI controller 14 is transmitted to the USB TYPE-C source device 2, the USB PD controller 13 performs a conversion process into a signal suitable for the USB PD protocol to reduce the number of pins to be used for transmitting the CEC signal. The path which is constructed in the adapter apparatus 1 to transfer the CEC signal from the HDMI sink device 3 to the USB TYPE-C source device 2 is also used for the communication for authentication conforming to the HDMI standard between the USB TYPE-C source device 2 which has transitioned to the HDMI Altmode and the HDMI sink device 3.

The power source connector 15 is a terminal for allowing connection to an external power source 4. In place of the power source connector 15, a power source cord for the connection to the external power source 4 may be provided. When the external power source 4 is a battery, the power source connector 15 may be structured as a storage portion for storing the external power source 4.

The PSC 16 generates power for operating the USB PD controller 13 and power for operating the HDMI controller 14, using the power input from the external power source 4 via the power source connector 15. The PSC 16 supplies the generated power to the USB PD controller 13 and the HDMI controller 14. The power source is not limited to an external power source. Power may be supplied from the USB VBUS.

In the adapter apparatus 1 having the above structure, when the USB TYPE-C source device 2 is connected to the USB TYPE-C connector 11, and when the HDMI sink device 3 is connected to the HDMI TYPE-A connector 12, the USB TYPE-C source device 2 transitions to the HDMI Altmode and outputs a video signal suitable for the HDMI sink device 3. The HDMI sink device 3 displays an image based on the video signal. Thus, transfer of a video signal from the USB TYPE-C source device 2 to the HDMI sink device 3 is realized. In addition, transfer of a CEC signal, which is used for the HDMI sink device 3 to control the USB TYPE-C source device 2, from the HDMI sink device 3 to the USB TYPE-C source device 2 is realized.

Every electronic apparatus which comprises a USE TYPE-C connector and is capable of outputting a video signal from the USB TYPE-C connector does not necessarily conform to the HDMI Altmode (in other words, does not necessarily support the HDMI Altmode). For example, when the user connects an electronic apparatus which does not conform to the HDMI Altmode (and comprises a USB TYPE-C connector) to the USB TYPE-C connector 11 of the adapter apparatus 1 as the USB TYPE-C source device 2, no image is displayed on the HDMI sink device 3 connected to the HDMI TYPE-A connector 12 of the adapter apparatus 1. When this problem has occurred, there is a high possibility that the user cannot specify because of which element the intended image display is not performed, specifically, because of the USB TYPE-C source device 2, the adapter apparatus 1, the HDMI sink device 3, the cable between the USB TYPE-C source device 2 and the adapter apparatus 1, or the cable between the adapter apparatus 1 and the HDMI sink device 3.

In the present embodiment, when the electronic apparatus connected to the USB TYPE-C connector 11 does not conform to the HDMI Altmode, in place of the electronic apparatus connected as the USB TYPE-C source device 2, the adapter apparatus 1 outputs, to the HDMI sink device 3, a video signal for notifying the user that the electronic apparatus connected to the USB TYPE-C connector 11 does not conform to the HDMI Altmode. To realize this function, the HDMI controller 14 of the adapter apparatus 1 comprises a warning processor 141. In this specification, to simplify the explanation, the electronic apparatus which is connected to the USB TYPE-C connector 11 and does not conform to the HDMI Altmode may also be called a USB TYPE-C source device 2.

As described above, the connection of the USE TYPE-C source device 2 to the USB TYPE-C connector 11 is detected by the USB PD controller 13. The Altmode transition processor 131 of the USB PD controller 13 performs a process for causing the USB TYPE-C source device 2 to transition to the HDMI Altmode.

The Altmode transition processor 131 inquires of the USB PD controller 21 of the USE TYPE-C source device 2 whether the device conforms to the HDMI Altmode. When the USB PD controller 21 of the USB TYPE-C source device 2 receives the inquiry, and further when the device conforms to the HDMI Altmode, the USB PD controller 21 sends a response indicating that the device conforms to the HDMI Altmode. When the device does not conform to the HDMI Altmode, the USE PD controller 21 sends a response indicating that the device does not conform to the HDMI Altmode. Thus, the USE PD controller 21 of the USB TYPE-C source device 2 of the present embodiment comprises a function for responding to the inquiry concerning whether the device conforms to the HDMI Altmode.

Regarding this inquiry, as described above, the adapter apparatus 1 inquires of the USB TYPE-C source device 2 whether the USB TYPE-C source device 2 supports the HDMI Altmode, and further, the USB TYPE-C source device 2 sends a response indicating whether the device supports the HDMI Altmode. Instead of this configuration, the adapter apparatus 1 may request the USB TYPE-C source device 2 to send a list of support functions (a list of conforming protocols as Altmodes). The USB TYPE-C source device 2 may send back a list of support functions. In this way, the adapter apparatus 1 may confirm whether the USB TYPE-C source device 2 supports the HDMI Altmode, using the support list sent back from the USE TYPE-C source device 2.

Alternatively, the adapter apparatus 1 may transmit, to the USB TYPE-C source device 2, a signal for determining whether the USB TYPE-C source device 2 supports the HDMI Altmode. The adapter apparatus 1 may determine whether the USB TYPE-C source device 2 supports the HDMI Altmode (mainly, the adapter apparatus 1 determines that the USB TYPE-C source device 2 does not support the HDMI Altmode) by confirming a predetermined operation, for example, by confirming that no response has been sent from the USB TYPE-C source device 2 for a predetermined period, or that a response has been sent conforming to a different protocol.

When a response indicating that the device conforms to the HDMI Altmode has been sent, the Altmode transition processor 131 causes the USB TYPE-C source device 2 to transition to the HDMI Altmode. The Altmode transition processor 131 notifies the HDMI controller 14 that the USB TYPE-C source device 2 conforms to the HDMI Altmode. When this notification has been received, the HDMI controller 14 connects the video signal line (Tx, Rx) of the USB TYPE-C connector 11 and the video signal line (TMDS) of the HDMI TYPE-A connector 12.

When a response indicating that the device does not conform to the HDMI Altmode has been sent, the Altmode transition processor 131 notifies the HDMI controller 14 that the USB TYPE-C source device 2 does not conform to the HDMI Altmode. When this notification has been received, the HDMI controller 14 disconnects the video signal line (Tx, Rx) of the USB TYPE-C connector 11 from the video signal line (TMDS) of the HDMI TYPE-A connector 12. At this time, the video signal line (TMDS) of the HDMI TYPE-A connector 12 is connected to the warning processor 141 of the HDMI controller 14. The video signal of an image indicating that the electronic apparatus connected to the USB TYPE-C connector 11 does not conform to the HDMI Altmode is output from the warning processor 141. This video signal is supplied to the HDMI sink device 3. For example, the image shown in FIG. 3 is displayed on the HDMI sink device 3. In this manner, the user can recognize that the intended image display is not performed because the USB TYPE-C source device 2 does not conform to the HDMI Altmode.

FIG. 3 shows the display screen of the HDMI sink device 3 by reference number 300. Here, the video signal of the image displayed on the display screen 300 is output from the warning processor 141 of the HDMI controller 14. The text data of the message indicated by reference number 301 and a command requesting that the text data be displayed may be transmitted to the HDMI sink device 3 by communication using, for example, DDC (SCL, SDA).

Instead of the display performed by the HDMI sink device 3, for example, the adapter apparatus 1 may comprise a speaker or a light-emitting diode (LED) to indicate that the USB TYPE-C source device 2 does not conform to the HDMI Altmode by audio output or lamp lighting.

FIG. 4 is an exemplary flowchart showing the operation procedure of the adapter apparatus 1 when the USB TYPE-C source device 2 is connected according to the first embodiment.

The adapter apparatus 1 detects the connection of the USB TYPE-C source device 2 to the USB TYPE-C connector 11 (block A1). The adapter apparatus 1 inquires of the USB TYPE-C source device 2 connected to the USB TYPE-C connector 11 whether the USB TYPE-C source device 2 conforms to the HDMI Altmode (block A2).

When a response indicating that the device conforms to the HDMI Altmode has been sent (YES in block A2), the adapter apparatus 1 causes the USB TYPE-C source device 2 to transition to the HDMI Altmode (block A3). In this way, authentication can be performed between the USB TYPE-C source device 2 and the HDMI sink device 3 in conformity with the HDMI standard. Thus, an appropriate video signal is output from the USB TYPE-C source device 2 to the HDMI sink device 3.

When a response indicating that the device does not conform to the HDMI Altmode has been sent (NO in block A2), in place of the USB TYPE-C source device 2, the adapter apparatus 1 performs authentication with the HDMI sink device 3 in conformity with the HDMI standard, and outputs, to the HDMI sink device 3, the video signal of an image indicating that the USB TYPE-C source device 2 does not conform to the HDMI Altmode (block A4).

As described above, in the adapter apparatus 1 of the present embodiment, when the USB TYPE-C source device 2 which does not conform to the HDMI Altmode is connected to the USB TYPE-C connector 11, the user can recognize that the USB TYPE-C source device 2 connected to the USB TYPE-C connector 11 does not conform to the HDMI Altmode.

Second Embodiment

A second embodiment is explained below.

FIG. 5 is an exemplary view showing the configuration of an adapter apparatus 1 as well as the connection form of the adapter apparatus 1 according to the present embodiment. Structural elements equivalent to those of the first embodiment are denoted by the same reference numbers, and detailed explanation is omitted. Although not shown in FIG. 5, a USB PD controller 13 comprises the Altmode transition processor 131 explained in the first embodiment, and an HDMI controller 14 comprises the warning processor 141 explained in the first embodiment.

As stated in the first embodiment, the adapter apparatus 1 comprises a function for transferring a CEC signal received from an HDMI sink device 3 to a USB TYPE-C source device 2 which has transitioned to the HDMI Altmode. Further, as explained above, when transferring the CEC signal, the CEC signal conforming to the HDMI protocol is converted into a signal suitable for the USB PD protocol because of the restriction on the number of pins usable in a USB TYPE-C connector 11.

Here, this specification assumes that the USE TYPE-C source device 2 connected to the USB TYPE-C connector 11 of the adapter apparatus 1 is a DVD player, and the HDMI sink device 3 connected to an HDMI TYPE-A connector 12 of the adapter apparatus 1 is a television receiver, and further, the user has performed an operation for the DVD player as the USB TYPE-C source device 2, such as a fast-forward operation, using the remote controller of the television receiver as the HDMI sink device 3. In this type of operation such as a fast-forward operation, a predetermined key is held down until the target scene is reached.

With regard to a case where a key is held down, a repeat (press and hold) time is defined in the HDMI CEC. A CEC signal indicating that a key has been pressed is supposed to be transmitted from the HDMI sink device 3 at intervals of time shorter than the repeat time.

However, when the USB TYPE-C source device 2 is connected to the HDMI sink device 3 with the adapter apparatus 1 interposed, as described above, overhead is produced in the adapter apparatus 1 to convert a CEC signal. Thus, the time from when the HDMI sink device 3 transmits a CEC signal to when the HDMI sink device 3 receives a response to the CEC signal from the USB TYPE-C source device 2 may exceed the repeat time defined in the HDMI CEC.

In the present embodiment, when a key is held down, the adapter apparatus 1 relays a CEC signal from the HDMI sink device 3 to the USB TYPE-C source device 2 without exceeding the repeat time defined in the HDMI CEC to report that the key is held down. The USB PD controller 13 of the adapter apparatus 1 comprises a key operation notification processor 132 which controls the relay of a CEC signal including the process for converting the CEC signal. The key operation notification processor 132 functions so as not to exceed the repeat time defined in the HDMI CEC when a key is held down. Here, the relay of a CEC signal refers to transfer of the content indicated by a CEC signal (CEC message). The number of CEC signals received by the adapter apparatus 1 from the HDMI sink device 3 does not necessarily conform to the number of CEC signals transmitted by the adapter apparatus 1 to the USB TYPE-C source device 2.

Figure 6:
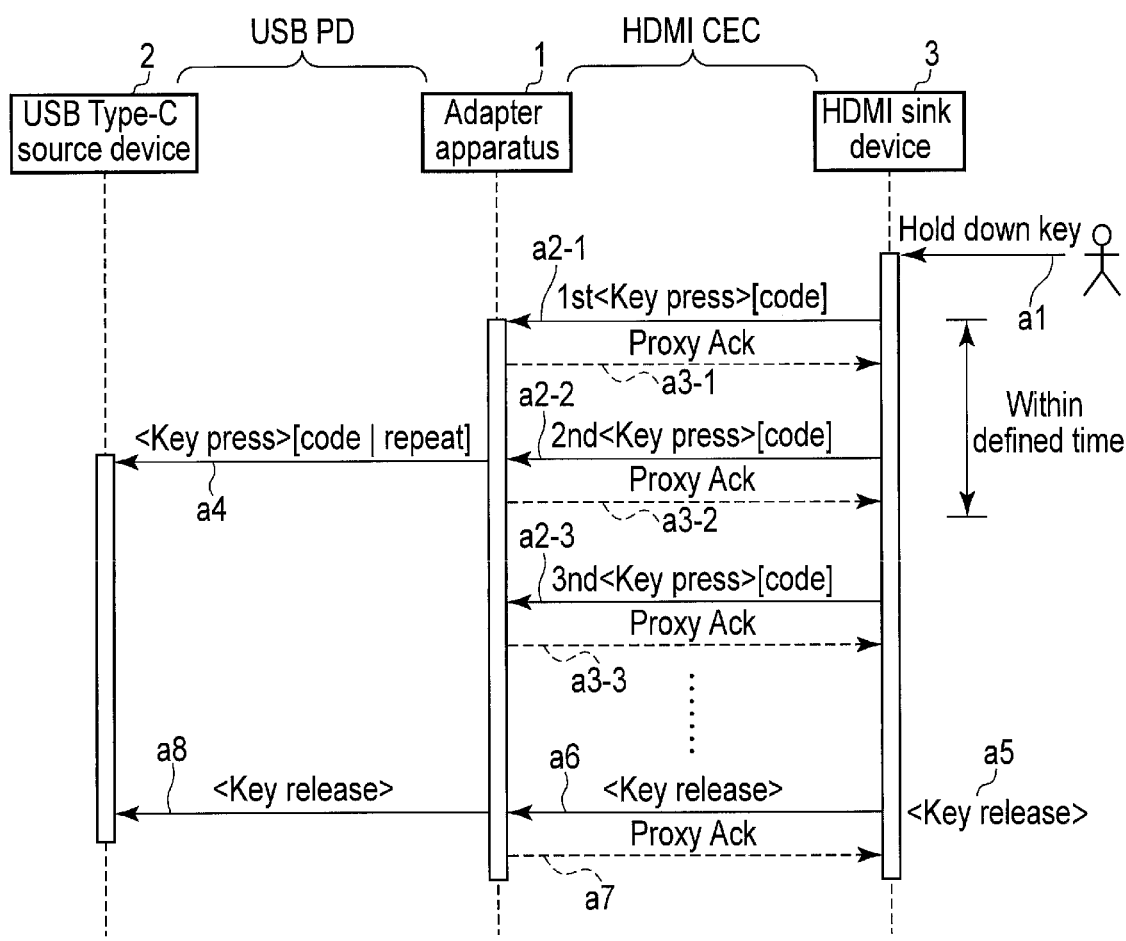
FIG. 6 is an exemplary sequence diagram shown for explaining an operation which is performed by the adapter apparatus when a key is held down (on the HDMI sink device side) according to the second embodiment.

FIG. 6 is an exemplary sequence diagram shown for explaining an operation which is performed by the adapter apparatus 1 (more specifically, the key operation notification processor 132 of the USB PD controller 13) when a key is held down.

When a key is held down on the remote controller of the HDMI sink device 3 (a1 in FIG. 6), the first CEC signal indicating that the key has been pressed is transmitted from the HDMI sink device 3 (a2-1 in FIG. 6). The adapter apparatus 1 transmits an alternative response to the CEC signal to the HDMI sink device 3 (a3-1 in FIG. 6). The adapter apparatus 1 stores the CEC signal.

When the key is held down, the second CEC signal indicating that the key has been pressed is transmitted from the HDMI sink device 3 within the repeat time defined in the HDMI CEC (a2-2 in FIG. 6). Since this CEC signal conforms to the stored CEC signal, the adapter apparatus 1 determines that the key is held down, and transmits, to the USB TYPE-C source device 2, a CEC signal indicating that the key is held down in conformity with the USB PD protocol (a4 in FIG. 6). The adapter apparatus 1 transmits, to the HDMI sink device 3, an alternative response to the CEC signal received from the HDMI sink device 3 (a3-2 in FIG. 6). The CEC signal indicating that the key is held down is structured so as to, for example, include a repeat code in addition to a key code.

A USB PD controller 21 provided in the USB TYPE-C source device 2 of the present embodiment comprises a function for interpreting a CEC signal indicating that a key is held down, as structured above. As a matter of course, when the USB PD controller 21 of the USB TYPE-C source device 2 successively receives the same CEC signals indicating that a key has been pressed within the repeat time defined in the HDMI CEC, the USB PD controller 21 is configured to also recognize that the key is being held down.

Subsequently, every time a CEC signal indicating that the key has been pressed is transmitted from the HDMI sink device 3 (a2-3, . . . in FIG. 6), the adapter apparatus 1 transmits, to the HDMI sink device 3, an alternative response to the CEC signal (a3-3, . . . in FIG. 6). When the key which is being held down is released (a5 in FIG. 6), a CEC signal indicating that the key has been released is transmitted from the HDMI sink device 3 (a6 in FIG. 6). Thus, the adapter apparatus 1 transmits a CEC signal indicating that the key has been released in conformity with the USB PD protocol to the USB TYPE-C source device 2 (a8 in FIG. 8). The adapter apparatus 1 transmits, to the HDMI sink device 3, an alternative response to the CEC signal received from the HDMI sink device 3 (a7 in FIG. 6).

When a CEC signal indicating that the key has been pressed is not received even beyond the repeat time defined in the HDMI CEC, or when a CEC signal different from the stored CEC signal is received, the adapter apparatus 1 determines that the key which is being held down has been released, and transmits a CEC signal indicating that the key has been released in conformity with the USB PD protocol to the USB TYPE-C source device 2.

The remote controller of the HDMI sink device 3 may comprise a key which is held down in some cases and is pressed as a one-shot operation in other cases. When this type of key is pressed as a one-shot operation, as shown in FIG. 7, a CEC signal indicating that the key has been pressed is transmitted from the HDMI sink device 3 (a12 in FIG. 7) in connection with the press of the key (a11 in FIG. 7). Since the key is immediately released, a CEC signal indicating that the key has been released is transmitted from the HDMI sink device 3 (a14 in FIG. 7) instead of the second CEC signal indicating that the key has been pressed. At this time, the adapter apparatus 1 determines that the key has been pressed as a one-shot operation. Based on the stored CEC signal, the adapter apparatus 1 transmits a CEC signal indicating that the key has been pressed in conformity with the USB PD protocol to the USB TYPE-C source device 2 (a16 in FIG. 7). Further, the adapter apparatus 1 transmits a CEC signal indicating that the key has been released in conformity with the USB PD protocol to the USB TYPE-C source device 2 (a17 in FIG. 7). In a manner similar to that of the above description, the adapter apparatus 1 transmits, to the HDMI sink device 3, alternative responses to the CEC signals received from the HDMI sink device 3 (a13, a15 in FIG. 7).

In the above manner, the adapter apparatus 1 of the present embodiment is capable of relaying a CEC signal transmitted from the HDMI sink device 3 to the USB TYPE-C source device 2 without exceeding the repeat time defined in the HDMI CEC when, for example, a key is held down on the remote controller of the HDMI sink device 3.

Third Embodiment

A third embodiment is explained below.

In the present embodiment, when a key is held down on the HDMI sink device 3 side as an operation for a USB TYPE-C source device 2 as explained in the second embodiment, an adapter apparatus 1 relays a CEC signal from the HDMI sink device 3 to the USB TYPE-C source device 2 without exceeding the repeat time defined in the HDMI CEC to report that the key is being held down by a method different from that of the second embodiment.

FIG. 8 is an exemplary sequence diagram shown for explaining an operation which is performed by the adapter apparatus 1 (more specifically, a key operation notification processor 132 provided in a USB PD controller 13) when a key is held down according to the present embodiment.

When a key is held down on the remote controller of the HDMI sink device 3 (b1 in FIG. 8), the first CEC signal indicating that the key has been pressed is transmitted from the HDMI sink device 3 (b2-1 in FIG. 8). The adapter apparatus 1 transmits, to the HDMI sink device 3, an alternative response to the CEC signal (b3-1 in FIG. 8). The adapter apparatus 1 stores the CEC signal. Further, the adapter apparatus 1 of the present embodiment transmits a CEC signal indicating that the key has been pressed in conformity with the USE PD protocol to the USB TYPE-C source device 2 (b4-1 in FIG. 8).

As explained in the second embodiment, when a key is held down, a CEC signal indicating that the key has been pressed is transmitted from the HDMI sink device 3 at intervals of time shorter than the repeat time defined in the HDMI CEC (b2-2, b2-3, . . . in FIG. 8). After receiving the first CEC signal, the adapter apparatus 1 of the present embodiment transmits a CEC signal indicating that the key has been pressed in conformity with the USB PD protocol to the USE TYPE-C source device 2 at predetermined intervals based on the stored CEC signal without waiting for the transmission of the second CEC signal from the HDMI sink device 3 (b4-1, b4-2, . . . in FIG. 8). These intervals are preferably shorter than the repeat time defined in the HDMI CEC, and longer than the intervals between a CEC signal indicating that the key has been pressed and a CEC signal indicating that the key has been released transmitted from the HDMI sink device 3 when the key is pressed as a one-shot operation.

Until a CEC signal indicating that the key has been released is transmitted from the HDMI sink device 3, the adapter apparatus 1 transmits, to the USB TYPE-C source device 2, a CEC signal indicating that the key has been pressed in conformity with the USB PD protocol at the above intervals based on the stored CEC signal. During this period, the adapter apparatus 1 transmits, to the HDMI sink device 3, an alternative response (b3-2, . . . in FIG. 8) to each CEC signal indicating that the key has been pressed (b2-2, . . . in FIG. 8) and transmitted from the HDMI sink device 3.

When the key being held down is released (b5 in FIG. 8), a CEC signal indicating that the key has been released is transmitted from the HDMI sink device 3 (b6 in FIG. 8). The adapter apparatus 1 transmits a CEC signal indicating that the key has been released in conformity with the USB PD protocol to the USB TYPE-C source device 2 (b8 in FIG. 8). The adapter apparatus 1 transmits, to the HDMI sink device 3, an alternative response to the CEC signal received from the HDMI sink device 3 (b7 in FIG. 8).

In the present embodiment, when a CEC signal indicating that the key has been pressed is not received even beyond the repeat time defined in the HDMI CEC, or when a CEC signal different from the stored CEC signal is received, the adapter apparatus 1 determines that the key being held down has been released, and transmits a CEC signal indicating that the key has been released in conformity with the USB PD protocol to the USB TYPE-C source device 2.

In the above manner, the adapter apparatus 1 of the present embodiment is capable of relaying a CEC signal transmitted from the HDMI sink device 3 to the USB TYPE-C source device 2 without exceeding the repeat time defined in the HDMI CEC when, for example, a key is held down on the remote controller of the HDMI sink device 3.

Fourth Embodiment

A fourth embodiment is explained below.

In the present embodiment, when a key is held down on the HDMI sink device 3 side as an operation for a USB TYPE-C source device 2 as explained in the second and third embodiments, an adapter apparatus 1 relays a CEC signal from the HDMI sink device 3 to the USB TYPE-C source device 2 without exceeding the repeat time defined in the HDMI CEC to report that the key is being held down by a hybrid method in which the methods of the second and third embodiments are combined with each other.

Figure 9:
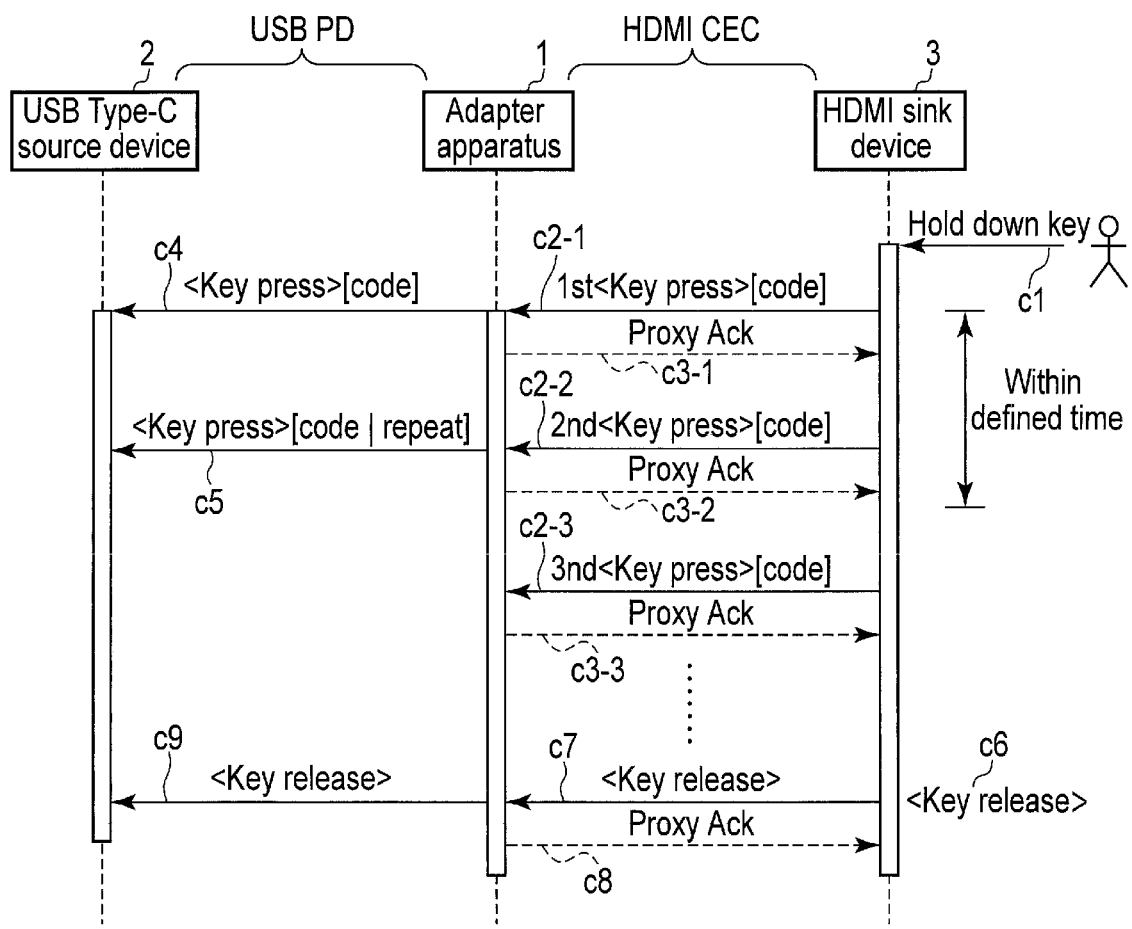
FIG. 9 is an exemplary sequence diagram shown for explaining an operation which is performed by an adapter apparatus when a key is held down (on the HDMI sink device side for a USB TYPE-C source device) according to a fourth embodiment.

FIG. 9 is an exemplary sequence diagram shown for explaining an operation which is performed by the adapter apparatus 1 (more specifically, a key operation notification processor 132 provided in a USB PD controller 13) when a key is held down according to the present embodiment.

When a key is held down on the remote controller of the HDMI sink device 3 (c1 in FIG. 9), the first CEC signal indicating that the key has been pressed is transmitted from the HDMI sink device 3 (c2-1 in FIG. 9). The adapter apparatus 1 transmits, to the HDMI sink device 3, an alternative response to the CEC signal (c3-1 in FIG. 9). The adapter apparatus 1 stores the CEC signal. Further, the adapter apparatus 1 transmits a CEC signal indicating that the key has been pressed in conformity with the USB PD protocol to the USB TYPE-C source device 2 (c4 in FIG. 9).

When the key is held down, the second CEC signal indicating that the key has been pressed is transmitted from the HDMI sink device 3 within the repeat time defined in the HDMI CEC (c2-2 in FIG. 9). Since this CEC signal conforms to the stored CEC signal, the adapter apparatus 1 determines that the key is being held down, and transmits, to the HDMI sink device 3, an alternative response to the CEC signal (c3-2 in FIG. 9). The adapter apparatus 1 transmits a CEC signal indicating that the key is being held down in conformity with the USB PD protocol to the USB TYPE-C source device 2 (c5 in FIG. 9).

Subsequently, every time a CEC signal indicating that the key has been pressed is transmitted from the HDMI sink device 3 (c2-3, . . . in FIG. 9), the adapter apparatus 1 transmits, to the HDMI sink device 3, an alternative response to the CEC signal (c3-3, . . . in FIG. 9). When the key being held down is released (c6 in FIG. 9), a CEC signal indicating that the key has been released is transmitted from the HDMI sink device 3 (c7 in FIG. 9). Thus, the adapter apparatus 1 transmits a CEC signal indicating that the key has been released in conformity with the USB PD protocol to the USB TYPE-C source device 2 (c9 in FIG. 9). The adapter apparatus 1 transmits, to the HDMI sink device 3, an alternative response to the CEC signal received from the HDMI sink device 3 (c8 in FIG. 9).

In the present embodiment, when a CEC signal indicating that the key has been pressed is not received even beyond the repeat time defined in the HDMI CEC, or when a CEC signal different from the stored CEC signal is received, the adapter apparatus 1 determines that the key being held down has been released. The adapter apparatus 1 transmits a CEC signal indicating that the key has been released in conformity with the USB PD protocol to the USB TYPE-C source device 2.

In the above manner, the adapter apparatus 1 of the present embodiment is capable of relaying a CEC signal transmitted from the HDMI sink device 3 to the USB TYPE-C source device 2 without exceeding the repeat time defined in the HDMI CEC when, for example, a key is held down on the remote controller of the HDMI sink device 3.

Fifth Embodiment

A fifth embodiment is explained below.

FIG. 10 is an exemplary view showing the configuration of an adapter apparatus 1 as well as the connection form of the adapter apparatus 1 according to the present embodiment. Structural elements equivalent to those of the first to fourth embodiments are denoted by the same reference numbers, and detailed explanation is omitted. Although not shown in FIG. 10, a USB PD controller 13 comprises the Altmode transition processor 131 explained in the first embodiment, and the key operation notification processor 132 explained in the second to fourth embodiments. An HDMI controller 14 comprises the warning processor 141 explained in the first embodiment.

The adapter apparatus 1 comprises a USB TYPE-C connector 11. A USB TYPE-C source device 2 connected to the USB TYPE-C connector 11 is capable of outputting a video signal to an HDMI sink device 3 by transitioning to the HDMI Altmode. In addition, the USB TYPE-C source device 2 is capable of operating based on a CEC signal from the HDMI sink device 3. In other words, the HDMI sink device 3 is capable of controlling the USB TYPE-C source device 2 based on a CEC signal.

Many electronic apparatuses comprise a function for transitioning to a standby state for power saving when, for example, the idle period exceeds a predetermined period. Even if the USB TYPE-C source device 2 conforms to the HDMI Altmode and has transitioned to the HDMI Altmode, the HDMI Altmode is disabled when transitioning to a standby state. Thus, even if the USB TYPE-C source device 2 conforms to the HDMI Altmode, for example, a sink device cannot use the function for activating the source device in a standby state defined in the HDMI CEC.

In the present embodiment, even when the USB TYPE-C source device 2 is in a standby state, and the HDMI Altmode is disabled, the adapter apparatus 1 is capable of controlling the USB TYPE-C source device 2 based on a CEC signal from the HDMI sink device 3. To realize this function, the HDMI controller 14 of the adapter apparatus 1 of the present embodiment comprises a CEC message management processor 142.

As explained in the first embodiment, when the USB PD controller 13 detects the connection of the HDMI sink device 3 to an HDMI TYPE-A connector 12, the EDID of the HDMI sink device 3 is obtained by the HDMI controller 14. The CEC message management processor 142 obtains and stores the physical address of the HDMI sink device 3 included in the EDID.

In addition, as stated in the first embodiment, the USB PD controller 13 which has detected the connection of the USB TYPE-C source device 2 to the USB TYPE-C connector 11 causes the USB TYPE-C source device 2 to transition to the HDMI Altmode when the USB TYPE-C source device 2 conforms to the HDMI Altmode. The CEC message management processor 142 monitors a CEC signal transmitted from the HDMI sink device 3 to the USB TYPE-C source device 2 which has transitioned to the HDMI Altmode. The CEC message management processor 142 obtains and stores the logical address of the USB TYPE-C source device 2 allocated to the stored physical address of the HDMI sink device 3. This logical address is included in the CEC signal.

Subsequently, it is assumed that the USB TYPE-C source device 2 transitions to a standby state, and the HDMI Altmode is disabled. Further, the HDMI sink device 3 is assumed to transmit a CEC signal to the USB TYPE-C source device 2 in a standby state with the HDMI Altmode disabled.

The CEC message management processor 142 monitors each CEC signal transmitted from the HDMI sink device 3 even while the USB TYPE-C source device 2 is in a standby state. When the stored logical address of the USB TYPE-C source device 2 is included in a CEC signal, the CEC signal is stored. The CEC message management processor 142 requests the USB PD controller 13 to cause the USB TYPE-C source device 2 in a standby state to be activated and transition to the HDMI Altmode. Further, the CEC message management processor 142 requests the USB PD controller 13 to transmit the stored CEC signal to the USB TYPE-C source device 2. As explained in the first embodiment, the Altmode transition processor 131 of the USB PD controller 13 is responsible for the transition of the USE, TYPE-C source device 2 to the HDMI Altmode. As explained in the second to fourth embodiments, the key operation notification processor 132 of the USB PD controller 13 is responsible for the transmission of CEC signals to the USB TYPE-C source device 2.

In the above manner, in place of the USB TYPE-C source device 2 in a standby state with the HDMI Altmode disabled, the adapter apparatus 1 of the present embodiment receives and stores a CEC signal transmitted from the HDMI sink device 3 to the USB TYPE-C source device 2. After the CEC signal is received and stored, the adapter apparatus 1 causes the USB TYPE-C source device 2 to be activated and transition to the HDMI Altmode, and transmits the stored CEC signal to the USB TYPE-C source device 2.

The adapter apparatus 1 of the present embodiment allows the HDMI sink device 3 to transmit a CEC signal to the USB TYPE-C source device 2 in a standby state with the HDMI Altmode disabled.

In other words, in the present embodiment, a USB PD controller 21 provided in the USB TYPE-C source device 2 comprises the following function. After the transition to the HDMI Altmode, the USB PD controller 21 is configured to receive, from the adapter apparatus 1, a CEC signal which was transmitted from the HDMI sink device 3 to the USB TYPE-C source device 2 while the USB TYPE-C source device 2 was not in the HDMI Altmode.

Figure 11:
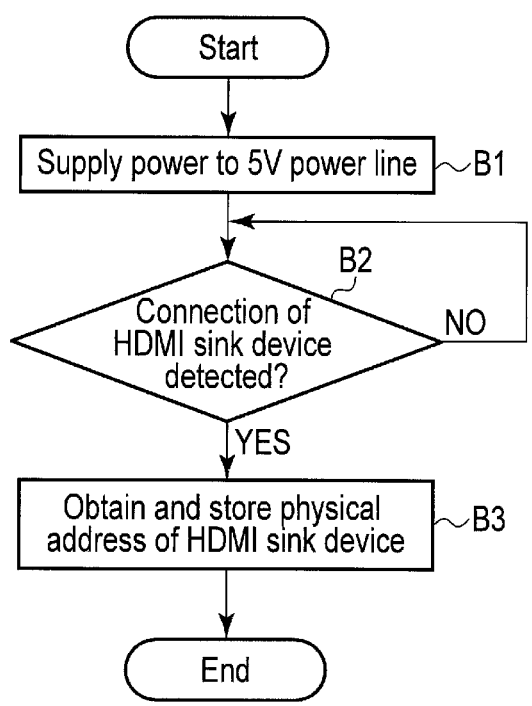
FIG. 11 is an exemplary flowchart showing the operation procedure of a process which is performed by the adapter apparatus of the fifth embodiment to store the physical address of an HDMI sink device.

FIG. 11 is an exemplary flowchart showing the operation procedure of a process which is performed by the adapter apparatus 1 of the present embodiment to store the physical address of the HDMI sink device 3.

The adapter apparatus 1 supplies power to the 5 V power line of the HDMI TYPE-A connector 12 (block B1) and monitors the connection of the HDMI sink device 3 by an HPD line (block B2). When the connection of the HDMI sink device 3 is detected (YES in block B2), the adapter apparatus 1 obtains the EDID of the HDMI sink device 3 by an SCL/SDA line, and stores the physical address of the HDMI sink device 3 included in the EDID (block B3).

FIG. 12 is an exemplary flowchart showing the operation procedure of a process which is performed by the adapter apparatus 1 of the present embodiment to store the logical address of the USB TYPE-C source device 2.

The adapter apparatus 1 causes the USB TYPE-C source device 2 to transition to the HDMI Altmode by a CC line when the USB TYPE-C source device 2 is connected (block C1). When the transition to the HDMI Altmode has been successful (YES in block C2), the adapter apparatus 1 causes the HPD line, a CEC line and a DDC (SCL/SDA line) to transition to a pass-through mode (block C3).

The adapter apparatus 1 monitors each CEC signal transmitted from the HDMI sink device 3 to the USB TYPE-C source device 2 which has transitioned to the HDMI Altmode by the CEC line (block C4). The adapter apparatus 1 detects the logical address of the USB TYPE-C source device 2 allocated to the stored physical address of the HDMI sink device 3 (block C5). This logical address is included in a CEC signal. When the logical address of the USB TYPE-C source device 2 is detected (YES in block C5), the adapter apparatus 1 stores the detected logical address of the USB TYPE-C source device (block C6).

Figure 13:
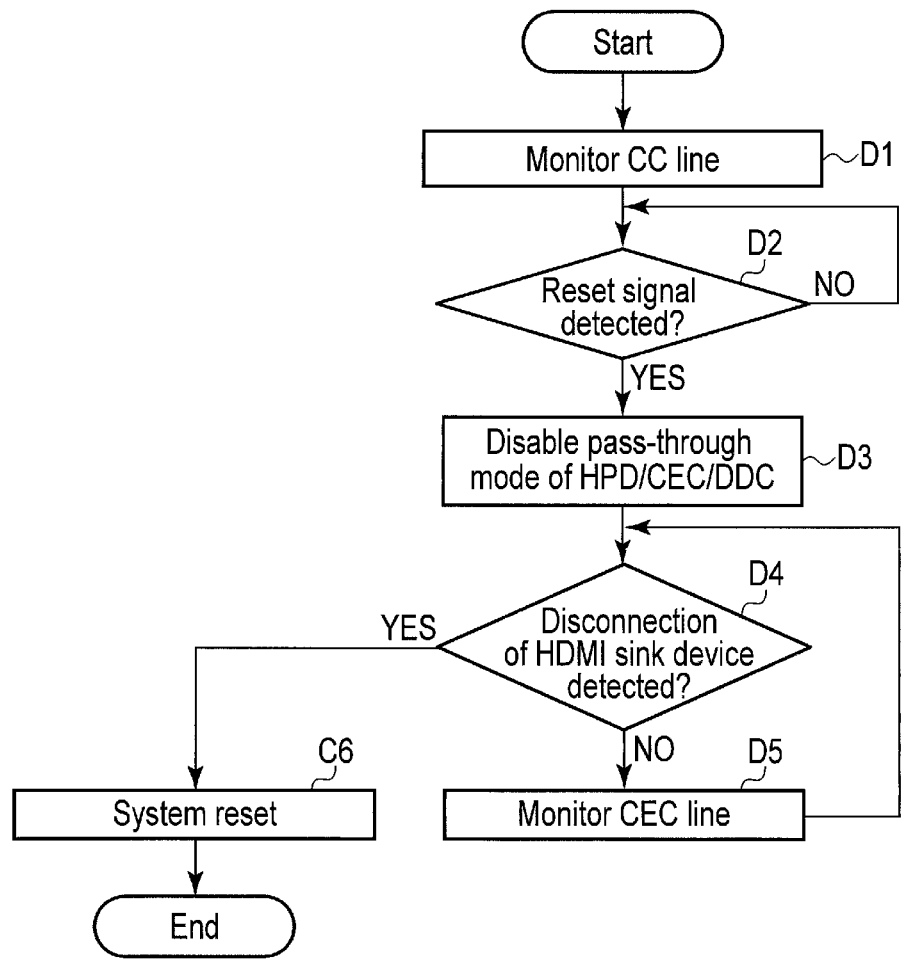
FIG. 13 is an exemplary flowchart showing the operation procedure of a process which is performed by the adapter apparatus of the fifth embodiment to disable the HDMI Altmode of the USB TYPE-C source device.

FIG. 13 is an exemplary flowchart showing the operation procedure of a process which is performed by the adapter apparatus 1 of the present embodiment to disable the HDMI Altmode of the USB TYPE-C source device 2.

The adapter apparatus 1 monitors the CC line to detect the disabling of the HDMI Altmode of the USB TYPE-C source device 2 (block D1). When a reset signal is detected (YES in block D2), the adapter apparatus 1 disables the pass-through mode of the HPD line, the CEC line and the DDC (SCL/SDA line) (block D3).

The adapter apparatus 1 monitors the disconnection of the HDMI sink device 3 by the HPD line (block D4). When the disconnection of the HDMI sink device 3 is not detected (NO in block D4), the adapter apparatus 1 monitors the CEC line to detect the transmission of a CEC signal from the HDMI sink device 3 to the USB TYPE-C source device 2 (block D5). When the disconnection of the HDMI sink device 3 is detected (YES in block D4), the adapter apparatus 1 executes a system reset (block D6).

FIG. 14 is an exemplary flowchart showing the operation procedure of a process which is performed by the adapter apparatus 1 of the present embodiment to cause the USB TYPE-C source device 2 to retransition to the HDMI Altmode.

The adapter apparatus 1 monitors each CEC signal (CEC message) transmitted from the HDMI sink device 3 (block E1), and determines whether each CEC message transmitted from the HDMI sink device 3 includes the stored logical address of the USB TYPE-C source device 2 (block E2). When a CEC message includes the stored logical address of the USB TYPE-C source device 2 (YES in block E2), the adapter apparatus 1 receives and stores the CEC message (block E3).

After the CEC message is received and stored, the adapter apparatus 1 activates the USB TYPE-C source device 2 which is in a standby state, and causes it to transition to the HDMI Altmode (block E4). The adapter apparatus 1 transmits the stored CEC message to the USE TYPE-C source device 2 which has transitioned to the HDMI Altmode (block E5), and causes the HPD line, the CEC line and the DDC (SCL/SDA line) to transition to a pass-through mode (block E6).

Subsequently, the adapter apparatus 1 monitors each CEC signal (CEC message) transmitted from the HDMI sink device 3 (block E7), and determines whether the logical address included in each CEC message transmitted from the HDMI sink device 3 conforms to the stored logical address of the USB TYPE-C source device 2 (block E8). When the logical addresses conform to each other (YES in block E8), the adapter apparatus 1 transfers the CEC message to the USE TYPE-C source device 2 (block E9). When they do not conform to each other (NO in block E8), the adapter apparatus 1 discards the CEC message (block E10).

As described above, the adapter apparatus 1 of the present embodiment allows the HDMI sink device 3 to transmit a CEC signal to the USB TYPE-C source device 2 which is in a standby state with the HDMI Altmode disabled.

Various functions described in the above embodiments may be implemented by a processing circuit. Examples of the processing circuit include a programmed processor such as a central processing unit (CPU). The processor realizes each of the described functions by executing a program stored in a memory. The processor may be an electronic circuit or a microprocessor. Examples of the processing circuit also include a digital signal processor (DSP), an application-specific integrated circuit (ASIC), a microcontroller, a controller and other electronic circuit components.

Since each process of the above embodiments can be implemented by a computer program, the same advantage as the embodiments can be easily achieved by installing the computer program into a general-purpose computer through a computer-readable storage medium that stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An adapter apparatus conforming to a first standard and a second standard, the adapter apparatus comprising:
    a first connector comprising a first shape conforming to the first standard, a first signal line to be connected to the first connector;
    a second connector comprising a second shape conforming to the second standard, a second signal line to be connected to the second connector, wherein the second shape is different from the first shape; and
    circuitry configured to:
        convert a command which is received from a second external apparatus connected via the second connector and which is transferred via the second signal line connected to the second connector into a format transferable via the first signal line connected to the first connector; and
        transmit a converted command to a first external apparatus,
    wherein the circuitry is further configured to relay, to the first external apparatus, each command which is transmitted from the second external apparatus at intervals of time shorter than a first time period defined in the second standard while a user interface key is being held down, such that a response to each command is sent to the second external apparatus within the first time period, by making an alternative response of each command for the second external apparatus.

2. The adapter apparatus of claim 1, wherein the circuitry is further configured to:
    transmit a first signal to the first external apparatus, the first signal associated with a request to determine whether a first mode is supported by the first external apparatus, the first mode corresponding to a communication mode that conforms to the second standard via both the first connector and the first signal line; and
    transmit a second signal to the second external apparatus via the second signal line when the first external apparatus does not support the first mode, the second signal comprising image data for displaying an image indicating that the first external apparatus does not support the first mode.

3. The adapter apparatus of claim 1, wherein the circuitry is further configured to:
    transmit a first signal to the first external apparatus, the first signal associated with a request to determine whether a first mode is supported by the first external apparatus, the first mode corresponding to a communication mode that conforms to the second standard via both the first connector and the first signal line; and
    notify a user that the first external apparatus does not support the first mode by light or sound.

4. The adapter apparatus of claim 1, wherein the circuitry is further configured to receive and store a message for the first external apparatus which is not in the first mode when the message is transmitted from the second external apparatus, to cause the first external apparatus to transition to the first mode, and to transmit the stored message to the first external apparatus, wherein the circuitry is further configured to:
    obtain a physical address of the second external apparatus from the second external apparatus, and obtain a logical address of the first external apparatus from a message transmitted from the second external apparatus to the first external apparatus which is in the first mode based on the physical address; and
    determine that a message transmitted from the second external apparatus after the first mode of the first external apparatus is disabled is a command for the first external apparatus, when the logical address is included in the message.

5. A communication method of an adapter apparatus comprising a first connector comprising a first shape conforming to a first standard and a second connector comprising a second shape conforming to a second standard, a first signal line to be connected to the first connector, a second signal line to be connected to the second connector, the second shape differing from the first shape, the method comprising:
    converting a command which is received from a second external apparatus connected via the second connector and which is transferred via the second signal line connected to the second connector into a format transferable via the first signal line connected to the first connector; and
    transmitting a converted command to a first external apparatus,
    wherein the method further comprises relaying, to the first external apparatus, each command which is transmitted from the second external apparatus at intervals of time shorter than a first time period defined in the second standard while a user interface key is being held down, such that a response to each command is sent to the second external apparatus within the first time period, by making an alternative response of each command for the second external apparatus.

6. The method of claim 5, further comprising:
    transmitting a first signal to the first external apparatus, the first signal associated with a request to determine whether a first mode is supported by the first external apparatus, the first mode corresponding to a communication mode that conforms to the second standard via both the first connector and the first signal line; and
    transmitting a second signal to the second external apparatus via the second signal line when the first external apparatus does not support the first mode, the second signal comprising image data for displaying an image indicating that the first external apparatus does not support the first mode.

7. The method of claim 5, further comprising:
    transmitting a first signal to the first external apparatus, the first signal associated with a request to determine whether a first mode is supported by the first external apparatus, the first mode corresponding to a communication mode that conforms to the second standard via both the first connector and the first signal line; and notifying a user that the first external apparatus does not support the first mode by light or sound.

8. The method of claim 5, further comprising:

receiving and storing a message for the first external apparatus which is not in the first mode when the message is transmitted from the second external apparatus, causing the first external apparatus to transition to the first mode, and transmitting the stored message to the first external apparatus;

obtaining a physical address of the second external apparatus from the second external apparatus, and obtaining a logical address of the first external apparatus from a message transmitted from the second external apparatus to the first external apparatus which is in the first mode based on the physical address; and determining that a message transmitted from the second external apparatus after the first mode of the first external apparatus is disabled is a command for the first external apparatus, when the logical address is included in the message.

* * * * *